United States Patent [19]
Lewis

[11] B 3,991,517
[45] Nov. 16, 1976

[54] SEED COATING
[75] Inventor: Paul A. Lewis, Salinas, Calif.
[73] Assignee: Union Carbide Corporation, New York, N.Y.
[22] Filed: Feb. 7, 1975
[21] Appl. No.: 548,028
[44] Published under the second Trial Voluntary Protest Program on February 3, 1976 as document No. B 548,028.
[52] U.S. Cl. .................................. 47/57.6; 47/56; 47/DIG. 9
[51] Int. Cl.² ......................................... A01C 1/06
[58] Field of Search ................. 47/57.6, 58, DIG. 9, 47/56; 111/1; 117/3

[56] References Cited
UNITED STATES PATENTS

| | | |
|---|---|---|
| 2,502,809 | 4/1950 | Vogelsang ........................ 47/57.6 X |
| 2,579,732 | 12/1951 | Funsten et al. ..................... 47/57.6 |
| 2,656,649 | 10/1953 | Ostier ................................. 47/57.6 |
| 2,967,376 | 1/1961 | Scott .................................. 47/57.6 |
| 3,707,807 | 1/1973 | Graves ............................... 47/57.6 |
| 3,808,740 | 5/1974 | Porter et al. ........................ 47/58 |

Primary Examiner—Robert E. Bagwill
Attorney, Agent, or Firm—Owen, Wickersham & Erickson

[57] ABSTRACT

Very thin coatings are applied to irregularly surfaced seeds to enable handling by seed-tape machines and other seed singulators. Improved adhesion of the coating to the seed and retention of the coating thereon is obtained by a spray process carried on while rotating a bed of seeds in a drum.

12 Claims, 4 Drawing Figures

SEED COATING

BACKGROUND OF THE INVENTION

This invention relates to an improved process for coating seeds and to an improved seed coating composition.

Some seeds lend themselves readily to the seedtaping process while others do not. Some of those not readily adaptable to seed taping are such seeds as celery, carrots, beets, and chard, all of which have irregular surfaces which create problems in the seed singulators and dispensers. Celery seeds, a particularly difficult type of seed to apply to seed tape, have a series of projecting ribs with recesses in between them that make it difficult to pick up and carry such seed by vacuum. Beet seed looks somewhat like the surface of the moon, with irregularities scattered all over. In all instances, gross irregularities do create difficulties.

Application Ser. No. 463,530 filed Apr. 24, 1974 by Peter J. Compton et al (now U.S. Pat. 3,893,258) is based on a discovery that such seed, and particularly celery seed, can be rendered suitable for seed taping by thinly coating it, the coating filling the recesses in between the ribs up to about the level of the ribs but not coating all of the ribs. The present invention relates to improvements in that type of coating,--in other words, a coating which is thin and which fills the surface irregularities but does not go beyond filling them. Too thick a coating may interfere somewhat with germination, it also consumes unnecessary material; further, it may make the seed too bulky for proper use in the seed tape.

The present invention is directed to the problem of obtaining a satisfactory coating of this thin type. Previous methods of coating celery seed left a powdery surface which gave poor results in a taping machine. Not only that, the coating tended to disintegrate when subjected to agitation, as while being fed into the seed tray or while moving in the seed tray of the seed-taping machine. The result was to leave only partially coated seed in the tray and to cause an extensive amount of dust particles to spread over the work area of the machine. Since so many of the seeds remained with fractured coatings and therefore with parts that were no longer coated, and since the nozzles which picked up the seeds could pick them up only where the nozzles engaged a smooth coat portion, this has meant that about 15% of the time the pickup nozzles failed to deliver seeds to the seed tape, and many spaces were left where seeds should have been. Inaccuracies of this order are undesirable.

Among the objects of the present invention are the provision of a new seed-coating composition and the provision of a new seed-coating method which ensures that the coating will stay on these difficult-to-handle, irregularly surfaced seeds and which therefore result in a much smaller error in seed taping. I have found that with my new coating it is possible to reduce errors (seed omissions) of these difficult-to-handle seeds below 5 percent, to eliminate the nuisance of dust, and to obtain generally improved results.

SUMMARY OF THE INVENTION

The present invention provides irregularly surfaced seeds with a hard, long-lasting, non-powdering, smooth and regular surface coating. Substantially the same basic materials may be used as have been used formerly, but they are used in different proportions and the coating is applied in a different way. The different proportions have enabled the coating to be sprayed on the seed, whereas the seed coating was formerly applied quite differently, namely, by coating the seeds with a sticking material (polyvinyl pyrrolidone) and then rotating the seeds in a drum while adding a dry mixture of coating material which was supposed to adhere to the sticky material. The polyvinyl pyrrolidone solution was supposed to provide a substantially uniform sticky coating over the surface of the seed and then, when the seed was tumbled with a starch ester derivative, it was supposed to pick up that powdered material. Unfortunately, the powdered material did not hold well to itself, and the sticking material did not pass through it to ensure such holding.

In the present invention, all the coating is applied at once by spraying a properly proportioned mixture--and correct proportioning is vital to the new composition-- -upon the seeds while the seeds are being tumbled in a drum. The exact amount of the materials needed is measured beforehand, and they are all mixed to provide a single slurry-solution combination, and the spray is applied at a rate determinable easily from observation but not easily explained without such observation, such that the seeds will not stick to each other and such that they will receive the desired coating. When the objects and ends of proper application are explained, as to some extent they have been explained here, the operator can easily determine visually the proper rate of application.

Uniformly good results have been obtained with celery and with other seed. By using this coating process, seed taping of the irregularly surfaced seeds has become much more accurate. An important feature is that the coating materials are not expensive, and the process is so simple that no special skill or training on the part of the operator is required. Moreover, the seeds themselves are dried during the coating process or very quickly thereafter and require no special handling nor storage after coating.

Other objects and advantages of the invention will appear from the following description of a preferred embodiment.

DESCRIPTION OF A PREFERRED EMBODIMENT

Figure 1:
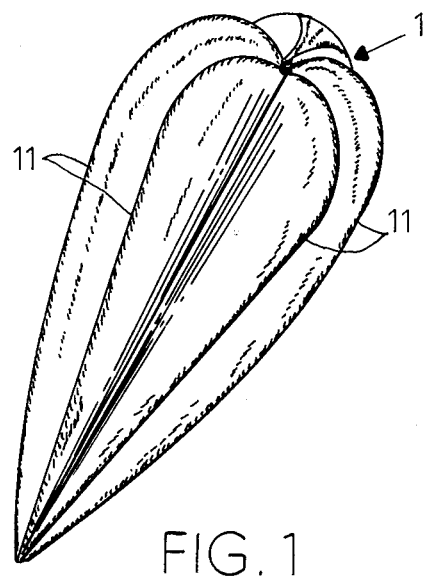
FIG. 1 is a greatly enlarged view in perspective of an uncoated celery seed.

The mixture employed in the present invention uses (1) a suitable dry, powdered seed-coating material, preferably a starch ester, (2) a material for sticking the coating material (e.g., the starch ester) to this seed and to itself, preferably polyvinyl pyrrolidone, and (3) a suitable vehicle or solvent enabling spraying. Suitable vehicles or solvents include alcohols, halogenated hydrocarbons (e.g., fluorocarbons and chlorocarbons), and aromatic hydrocarbons, either singly or in mixtures. For example, methylene chloride is an excellent vehicle, but, because of its toxicity, it is preferably diluted with isopropyl alcohol, to enable use of the miniumum amount of methylene chloride while still obtaining its superior ability to carry the starch ester. The ratio of the isopropyl alcohol to the methylene chloride varies with ambient conditions, as explained below. There should be enough sticker to provide sticking; in other words, the polyvinyl pyrrolidone should be present in an amount sufficient to hold the material to the seed and to hold the coating to itself. This is typically about 100 grams to 300 grams per kilogram of the starch ester. The starch ester provides the bulk of the coating, and the other ingredients are used in amounts sufficient to enable spraying, insure sticking to the seed, and adherence of the coating to itself.

The materials used in the invention may be exactly the same materials as were used in the coating described in application Ser. No. 463,530 filed Apr. 24, 1974. These materials are isopropyl alcohol, methylene chloride, starch ester of the type known as "Dry Flo" supplied by National Starch and Chemical Corporation, and polyvinyl pyrrolidone. A dye may also be used if desired. However, the proportions are different and the method of application is quite different from what was described in U.S. Pat. No. 3,893,258.

The total amount of vehicle (solvent) relative to the starch ester is dependent upon the flow rate to be used and the orifice opening in the nozzle. A large nozzle is capable of handling a thicker, less viscous mixture, while a small nozzle requires a thinner, more dilute mixture. Thus, the total amount of the vehicle, which should be azeotropic, may vary from about 500 to 3000 grams per kilogram of the starch ester.

As to the effect of the ambient conditions on the ratio of the alcohol to the halogenated hydrocarbon, for normal or standard conditions of temperatures and humidity, I prefer to use about 2 to 4 times as much isopropyl alcohol (for example) as methylene chloride (for example). However, when the ambient conditions become colder or more humid or both, more methylene chloride is used and the ratio of isopropyl alcohol to methylene chloride may go up to about 1 to 40. On the other hand, when conditions are warmer or drier or both, then less methylene chloride than normal is required and the ratio of isopropyl alcohol to methylene chloride may rise to as high as about 20 to 1.

The amount of material needed for each batch of seeds is based upon the amount of raw seed to be coated.

For example, a five-pound batch of celery seeds was treated with a mixture of the following:

| | |
|---|---|
| isopropyl alcohol (99%) | 1200 ml |
| methylene chloride | 600 ml |
| starch ester ("Dry Flo") | 2200 gms |
| polyvinyl pyrrolidone | 240 gms |
| dye | 5 gms |

These materials were mixed together to provide substantially a solution of a mixture of isopropyl alcohol and methylene chloride of the polyvinyl pyrrolidone and dye and a suspension of the starch ester. Any desired procedure for obtaining the complete mixture may be used so long as the mixing is thorough. Thereafter, the mixture should be agitated immediately before use, and even during use, to prevent the starch ester from settling to the bottom of the container.

The proportions of the various materials can be changed somewhat from the exact proportions given by way of a successful example, a workable formula presently known to the inventor.

Another example of a successful formula, used to coat 5 pounds of celery seed, is as follows:

| | |
|---|---|
| isopropyl alcohol | 3000 ml |
| methylene chloride | 760 ml |
| starch ester (Dry-Flo) | 1730 gms |
| polyvinyl pyrrolidone | 340 gms |

Figure 2:
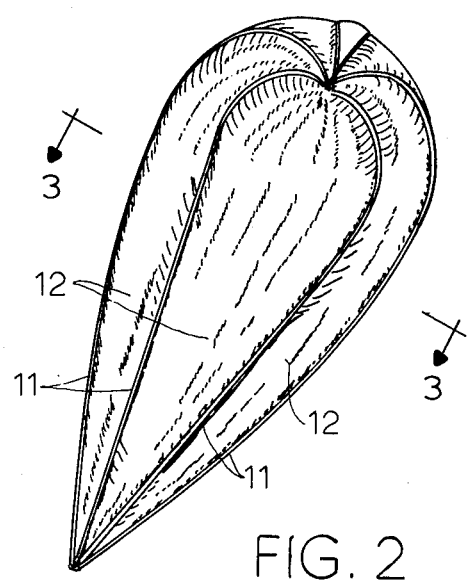
FIG. 2 is a similar view of the seed of FIG. 1 coated according to the principles of the invention.
Figure 3:
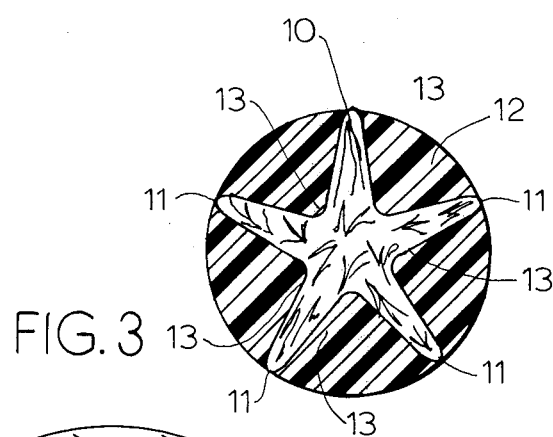
FIG. 3 is a view in section taken through FIG. 2 along the line 3—3.

A celery seed 10, such as is shown greatly enlarged in FIGS. 1, 2 and 3, has a series of ribs 11 with recesses in between them. It is desired to provide a coating 12 so that it will fill the recesses 13 in between the ribs 11 and make a smooth-walled coated seed with a smooth-surfaced coating.

Figure 4:
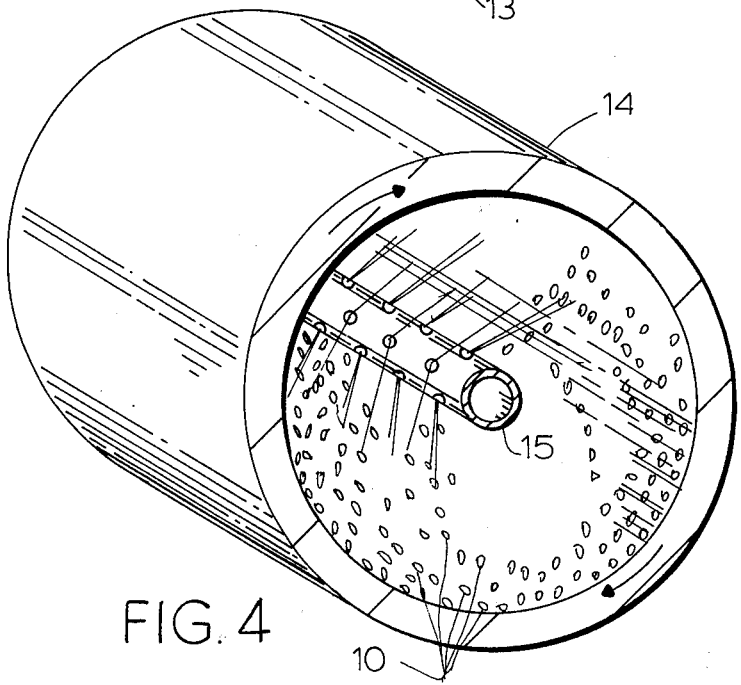
FIG. 4 is a diagrammatic view of a spraying process embodying the principles of the invention.

As shown in FIG. 4, the uncoated celery seeds 10 are placed in a drum 14 and rotation is begun. Then a spray gun 15 is used with suitable mixture feeding equipment to spray a mixture 16 like that described above into the rotating drum 14 so that it impinges on the seeds 10. From time to time the operator checks to be sure that the operation is proceeding properly, watching especially to avoid too-rapid application that might cause the seeds to stick to each other and might result in two or three seeds ending up as one coated unit. This is extremely undesirable; so the application is kept slow enough so that that will not happen. Moreover, the temperature should preferably not exceed 80°F., but heat may be added at the same time as the spray if one is operating in too cool a location. Too high a temperature can evaporate the solvent from the mixture before it sticks to the seeds, and this, of course, is again readily remedied by paying attention to what is happening.

When the full amount of the mixture has been sprayed, the coated seeds may be removed from the drum 14 and placed in a tray for seiving. It will be noted that nearly always the coating is by this time completely dried. If it is not, it is permitted to dry completely. But under normal conditions, it will dry automatically during the application of the mixture. If the coating is not dry, the sieving process will not work properly and may remove some of the coating. The purpose of the sieving is to eliminate free particles of coating, to ensure that all the coating present is adhered to the seeds, and to remove large size clumps that might contain more than one seed.

The ratio of the weight of the coated seed to the weight of the seed before coating generally lies in the range of between 1.1 to about 3:1. For celery seed it is preferably in the range of 1.2:1 to 1.4:1.

The same basic principles apply to other irregularly surfaced seeds, care being taken to determine how much of the coating material is needed to assure the thin coating that is important for proper seed taping.

The coating is long-lasting and non-powdering. It gives greatly improved accuracy with seed-taping machines. Germination tests on the coated seed by itself and on the coated seed when applied in a tape of polyethylene oxide have both shown no degradation due to the coating process, and the coated seed has given uniformly good results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A seed-coating material comprising a mixture of one or more azeotropic liquids chosen from the group consisting of the liquid alcohols, aromatic solvents, and halogenated hydrocarbons; starch ester; and polyvinyl pyrrolidone wherein per kilogram of starch ester there are about 100 gms. to about 300 gms. of polyvinyl pyrrolidone and about 500 gms. to about 3000 gms. of said one or more azeotropic liquids.

2. The material of claim 1 wherein said mixture comprises an azeotropic mixture of isopropyl alcohol and methlene chloride.

3. The material of claim 2 wherein the ratio of isopropyl alcohol to methylene chloride lies in the range of from about 20 to 1 to about 1 to 40.

4. The material of claim 2 wherein the ratio of isopropyl alcohol to methylene chloride lies in the range from about 2 to 1 to about 4 to 1.

5. The material of claim 2 wherein, per kilogram of starch ester, there are about 540 ml of isopropyl alcohol, about 270 ml of methylene chloride, and about 110 grams of polyvinyl pyrrolidone.

6. The material of claim 2 wherein per kilogram of starch ester there are about 800 ml of an azeotropic mixture of isopropyl alcohol and methylene chloride, and about 110 grams of polyvinyl pyrrolidone.

7. A method of coating seeds having irregular surfaces to provide a thin coating enabling them to be processed by seed singulators and seed-tape making machines comprising:

spraying on to said seeds while the seeds are being tumbled a mixture of (1) powdered dry starch ester, and (2) polyvinyl pyrrolidone in sufficient mixture to cause the mixture to stick to the seeds and for the coating to stick to itself and (3) sufficient liquids to enable spraying.

8. The method of claim 7 wherein said liquids are an azeotropic mixture of an alcohol and a halogenated hydrocarbon.

9. The method of claim 7 wherein said liquids comprise a mixture of one or more azeotropic liquids chosen from the group consisting of the liquid alcohols, aromatic solvents, and halogenated hydrocarbons.

10. A method of coating seeds having irregular surfaces to provide a thin coating enabling them to be processed by seed singulators and seed-tape making machines comprising:

spraying on to said seeds while the seeds are being tumbled a mixture of isopropyl alcohol, methylene chloride, starch ester, and polyvinyl pyrrolidone in sufficient mixture to cause the mixture to stick to the seeds and for the coating to stick to itself and with sufficient liquids to enable spraying.

11. A method of coating seeds having irregurlar surfaces to provide a thin coating enabling them to be processed by seed singulators and seed-tape making machines comprising:

spraying on to said seeds while the seeds are being tumbled a mixture of starch ester, polyvinyl pyrrolidone in an amount of 100 to 300 grams per kilogram of starch ester, and an azeotropic mixture of isopropyl alcohol and methylene chloride in an amount of 500 grams to 3000 grams per kilogram of starch ester and in a ratio of from 20:1 to 1:40.

12. The method of claim 11 wherein the ratio of isopropyl alcohol to methylene chloride is from 2:1 to 4:1.

* * * * *